Figure 1:
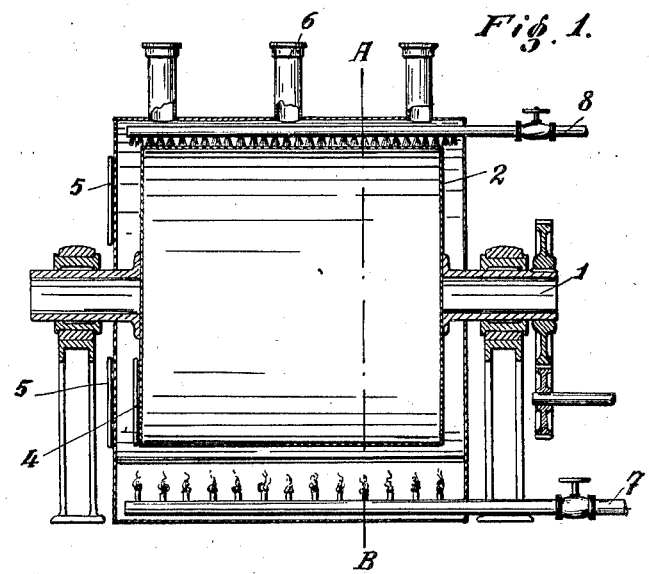

April 8, 1930.   A. MRACH   1,754,177
APPARATUS FOR REGENERATING VULCANIZED RUBBER Filed Oct. 5, 1926

Inventor:
Adolfo Mrach
By
Attorney

Patented Apr. 8, 1930

1,754,177

UNITED STATES PATENT OFFICE

ADOLFO MRACH, OF MILAN, ITALY, ASSIGNOR TO SOCIETÁ ITALIANA PIRELLI, OF MILAN, ITALY

APPARATUS FOR REGENERATING VULCANIZED RUBBER

Application filed October 5, 1926, Serial No. 139,710, and in Italy October 31, 1925.

The so called regeneration of vulcanized rubber is mainly carried out by warming rubber scrap, more or less coarsely ground, with a suitable solution of caustic-soda.

In the so-called alkali-process, usually employed, a dilute solution of caustic-soda, for instance a 3 to 5% soda-lye solution is used for the purpose. As a thoroughly good devulcanization requires a temperature of at least 170° C. which is much higher than the boiling point of the soda solution employed, the process must be carried on in closed boilers provided with stirring arms and capable of sustaining working pressures of 115 to 170 lbs per sq. inch.

This way of treating rubber has many drawbacks inherent to the use of high pressure boilers and to the handling and warming of large volumes of liquid. It has been suggested to avoid these drawbacks by using highly concentrated soda solutions whose boiling points are higher than the temperature required for devulcanizing rubber scrap, thus allowing the process to be carried out in open vessels.

Such a process however has never been practically applied owing to the difficulty of obtaining such high concentrations of the soda-lye as would be required. Besides, such a process also requires the use of large volumes of liquid which are difficult to handle and entails a considerable waste of heat for warming the same: Furthermore, the solution poured out of the treating vessel after the operations are ended, and still containing a high percentage of soda, cannot be used again, nor can the soda be recovered, so that it is wasted.

The present invention involves a much more convenient and economical process, employing solutions of caustic-soda of medium concentration (for instance, a 35–36° Bé. solution which can usually be obtained from the trade), and its object is to provide an improved apparatus for carrying out such process. According to the new process, there is added to the pulverized rubber scrap a quantity of such solution which is slightly in excess of the quantity chemically corresponding to the sulphur contained in the rubber to be regenerated. Such a solution is easily absorbed by the ground rubber producing a mass which can be stirred by any known means because it retains its pulverulent character. If such a mixture be deposited in an open vessel, suitably stirred and heated by an external source of heat at a suficiently high temperature, a gradual concentration of the solution imbibing the rubber will follow, until its boiling point reaches the temperature required for the proper treatment under atmospheric pressure of the rubber scrap.

In this way, after a treatment of a certain number of hours, a complete and satisfactory regeneration is obtained.

The process offers many advantages: besides those arising from the fact that high pressure boilers and large volumes of solution are avoided and great quantities of waste heat are saved, a considerable saving in soda is obtained, and the product shows a more thorough regeneration than those obtained by the ordinary processes and proves of a higher quality.

Experience has shown that 220 lbs. of old rubber-scrap (old motor-car tires) properly ground, can be mixed with 66 lbs. of caustic soda-lye at 35° Bé. and containing about 20 lbs. of pure caustic soda, while the theoretical proportion which would be necessary to secure the chemical combination with the sulphur contained in the rubber can be reckoned about 13 lbs.

Figure 2:
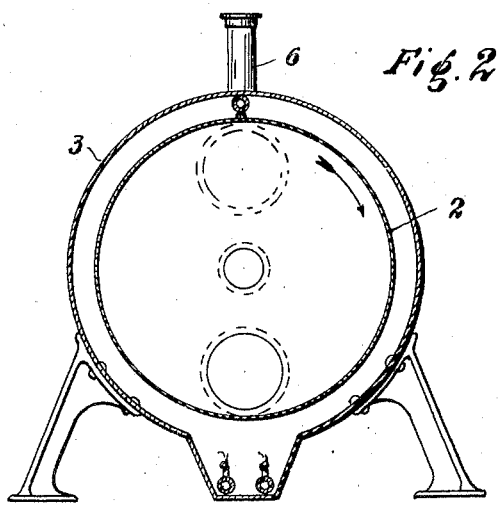

The apparatus to be used with this process, and which forms the object of the invention, as has been stated, is very simple and cheap. The accompanying drawing shows the preferred embodiment thereof, Fig. 1 being a longitudinal vertical section and Fig. 2 a vertical cross-section of said apparatus. The improved apparatus consists of a drum 2 having a circular or polygonal section, made of sheet metal and placed horizontally so as to revolve around shaft 1 which does not go through the drum but forms two trunnions fixed to the end plates (Fig. 1). These trunnions are hollow so as to allow pyrometers or other heat registering or indicating instruments to be inserted in the drum. Such drum is provided at one or both end plates with doors 4 for charging or discharging the materials and inspecting the conditions of the same during the devulcanization. As may be seen, this drum is never hermetically closed, so that the internal pressure is never substantially higher than atmospheric pressure.

The revolving drum 2 is surrounded by a second fixed drum 3 concentric with the former and also built of thin plate, appropriately insulated against heat dispersion, having in its lower part a chamber (Fig. 2) where the heating means are arranged. These can comprise a single gas burner 7 or a set of burners having a suitable number of jets. The heating can be obtained in many other ways, always from the outside, for instance by using electric current.

On the upper part of the outer drum are conveniently placed vents 6 for the discharge of the combustion gases.

The front end of the same drum is provided with doors 5—5 which correspond to the previously mentioned doors 4 in the inner drum, for charging and discharging the materials and for inspection.

In the upper part of the outer drum is also placed a pipe 8, perforated along its lower edge, from which cold water can be sprinkled at the end of each operation to obtain a rapid cooling of the product if desired.

The operation of the apparatus is self explanatory; the working temperature varies, according to the nature of the scrap, between 130° C. and 235° C. Operating under such conditions and with a soda-lye solution as above, the mixture can be heated up to 250° C. without the rubber agglomerating, becoming glutinous or sticking to the surfaces with which it comes in touch.

The circumferential speed of the internal drum can be about 100 feet per minute, but it is evident that higher or lower speeds can be used. The time spent for a complete operation: charging, heating and final cooling included, ranges usually from six to seven hours but may vary with the size of the drum, the bulk of rubber treated at one time and the quality of the scrap.

At the end of the devulcanizing operation, the material so treated is taken out of the drum and subjected to a thorough washing to take away every trace of soda and soluble compounds formed in it during the heat-treatment, whereafter the product is dried either in the drum itself or by any other convenient means.

The caustic soda may be replaced by any other alkali or salts capable of absorbing sulphur, as for instance alkaline sulphides, without exceeding the limits of the present invention.

*Example.*—220 lbs. of old rubber scrap, rather finely ground, are charged in the drum described above with 66 lbs. of caustic soda-lye at 35° Bé.; the drum is revolved and rapidly heated at first to 135° C. then slowly up to 210° C., the entire process lasting seven hours, after which the product is washed and dried.

In case the scrap should contain fabric or textile fibers as in old motor-car tires, the former are destroyed by the action of the caustic soda or may be destroyed by a preliminary soaking in dilute sulphuric acid.

What I claim is:

Apparatus for regenerating vulcanized rubber scrap, comprising an outer stationary drum having a chamber in its bottom part; a rotatable inner drum disposed concentrically within the outer drum with its walls spaced therefrom, the inner drum having hollow trunnions on its end walls which project outward through the end walls of the outer drum to connect the interior of said inner drum directly and freely with atmosphere; supporting standards wherein the projecting portions of said trunnions are journalled; driving means connected to one trunnion to rotate said inner drum; and heating means in said chamber for externally heating the inner drum.

In testimony whereof I affix my signature.

ADOLFO MRACH.